(12) United States Patent
Yu

(10) Patent No.: US 8,781,325 B2
(45) Date of Patent: Jul. 15, 2014

(54) METHODS AND SYSTEMS FOR COHERENT MULTI-SUBCARRIER SOURCE GENERATION

(75) Inventor: Jianjun Yu, Basking Ridge, NJ (US)

(73) Assignees: ZTE Corporation, Chenzhen (CN); ZTE (USA) Inc., Richardson, TX (US)

( * ) Notice: Subject to any disclaimer, the term of this patent is extended or adjusted under 35 U.S.C. 154(b) by 73 days.

(21) Appl. No.: 13/407,017

(22) Filed: Feb. 28, 2012

(65) Prior Publication Data
US 2012/0219296 A1  Aug. 30, 2012

Related U.S. Application Data

(60) Provisional application No. 61/447,377, filed on Feb. 28, 2011.

(51) Int. Cl.
*H04J 14/00* (2006.01)
*H04J 4/00* (2006.01)
*H04B 10/04* (2006.01)
*H04B 10/12* (2006.01)
*H04L 27/26* (2006.01)
*H04L 27/20* (2006.01)
*H04B 10/50* (2013.01)
*H04B 10/548* (2013.01)

(52) U.S. Cl.
CPC ........ *H04L 27/2096* (2013.01); *H04L 27/2697* (2013.01); *H04B 10/5051* (2013.01); *H04L 27/2637* (2013.01); *H04B 10/548* (2013.01)
USPC ............................................. 398/76; 398/182

(58) Field of Classification Search
None
See application file for complete search history.

(56) References Cited

U.S. PATENT DOCUMENTS

| 2002/0015212 A1* | 2/2002 | Fujiwara et al. | 359/238 |
| 2003/0142384 A1* | 7/2003 | Kurebayashi | 359/237 |
| 2011/0115537 A1* | 5/2011 | May et al. | 327/170 |

* cited by examiner

*Primary Examiner* — David Payne
*Assistant Examiner* — Casey Kretzer
(74) *Attorney, Agent, or Firm* — Drinker Biddle & Reath LLP

(57) ABSTRACT

A method of generating a multi-subcarrier optical signal is disclosed. A local oscillator oscillates one or more data signals to generate one or more oscillating data signals. A series of modulators phase modulate a lightwave to generate a phase modulated lightwave, wherein the series of modulators are driven by the one or more oscillating data signals. The intensity modulator modulates the phase modulated lightwave, the intensity modulator being driven by one of the oscillating data signals, to generate the multi-subcarrier optical signal.

19 Claims, 1 Drawing Sheet

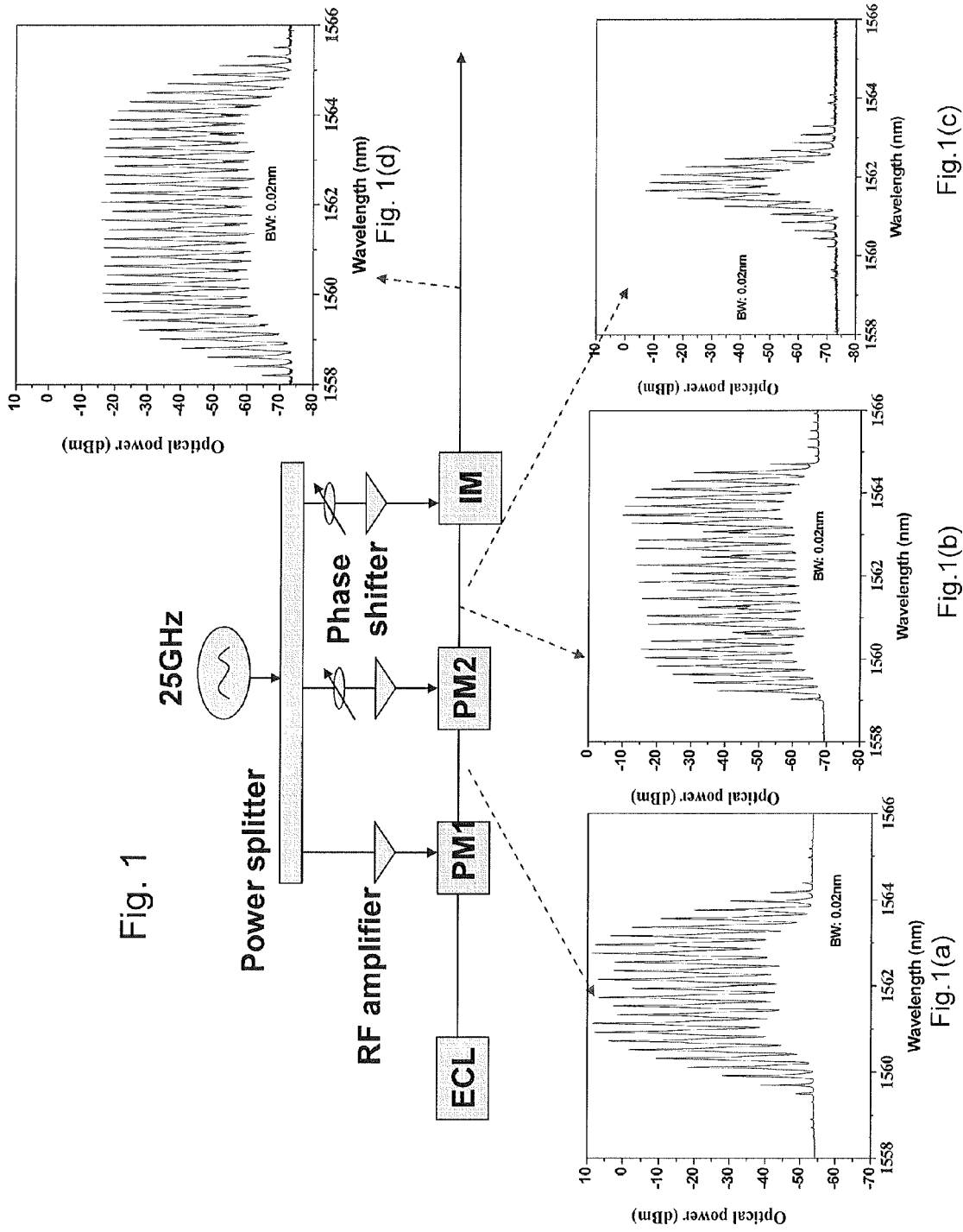

METHODS AND SYSTEMS FOR COHERENT MULTI-SUBCARRIER SOURCE GENERATION

FIELD OF THE INVENTION

The field of the present invention relates to optical communication architecture, particularly to optical communication processes and systems which employ orthogonal frequency division multiplexing.

BACKGROUND

Recently, techniques for optical orthogonal frequency division multiplexing ("O-OFDM") signals have been demonstrated to extend the total capacity of transmission and to increase spectral efficiency for optical communications systems. For example, as described by J. Yu, "1.2 Tbit/s orthogonal PDM-RZ-QPSK DWDM signal transmission over 1040 km SMF-28", in Electron. Lett., Vol. 46, No. 11, 2010: 775-777, a highest bit rate per channel of 5.4 Tb/s OFDM PM-QPSK and 10.8 Tb/s OFDM PM-16QAM optical signal generation has been demonstrated by comb generation and a supercontinuum technique. However, due to the limited optical signal to noise ratio ("OSNR") of an OFDM signal generated by the supercontinuum technique, signal transmission distance may be limited, making this technique somewhat impractical for long distance transmission.

As described by R. Dischler, and F. Buchali, "Transmission of 1.2 Tb/s continuous waveband PDM-OFDM-FDM signal with spectral efficiency of 3.3 bit/S/Hz over 400 km of SSMF", in Proc. OFC, paper PDPC2 (2009); J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28" n Optics Express, 17, 17928-17933 (2009); and J. Yu, "1.2 Tbit/s orthogonal PDM-RZ-QPSK DWDM signal transmission over 1040 km SMF-28", in Electron. Lett., Vol. 46, No. 11, 2010: 775-777, the technique of applying a phase modulator in series with an intensity modulator can be used to generate 400 Gb/s and 1.2 Tb/s optical signals. Due to the limited amplitude of the RF signals on the phase modulator, only 12 subcarriers covering approximately 300 GHz bandwidth with flat spectrum subcarriers can be generated, as described in J. Yu, "1.2 Tbit/s orthogonal PDM-RZ-QPSK DWDM signal transmission over 1040 km SMF-28", in Electron. Lett., Vol. 46, No. 11, 2010: 775-777. To increase the bit rate for a single channel, more subcarriers need to be generated. Accordingly, an improved method and system for generating more subcarriers is desired.

SUMMARY OF THE INVENTION

The present invention is directed towards methods and systems for generating multi-subcarrier optical signals.

In these methods and systems, a data signal is oscillated to generate an oscillated data signal. The oscillated data signal is amplified to generate an amplified oscillated data signal which drives a series of phase modulators and an intensity modulator. A lightwave is modulated by the series of phase modulators to generate a phase modulated lightwave. The phase modulated lightwave is then modulated by the intensity modulator to generate a multi-subcarrier optical signal.

Additional aspects and advantages of the improvements will appear from the description of the preferred embodiment.

BRIEF DESCRIPTION OF THE DRAWINGS

Embodiments of the present invention are illustrated by way of the accompanying drawings, in which:

FIG. 1 is a block diagram of a multi-peak generation system using cascaded modulators.

FIG. 1(a) illustrates an optical spectrum of a lightwave after being modulated by a first phase modulator.

FIG. 1(b) illustrates an optical spectrum of a lightwave with the greatest number of subcarriers, after being modulation by a second phase modulator.

FIG. 1(c) illustrates an optical spectrum of a lightwave with the fewest number of subcarrers, after being modulated by the second phase modulator.

FIG. 1(d) illustrates an optical spectrum of a lightwave after being modulated by the intensity modulator.

DETAILED DESCRIPTION OF THE PREFERRED EMBODIMENTS

Turning in detail to the drawings, FIG. 1 shows a multi-peak generation system using cascaded external modulators, which includes a first phase modulator ("PM1"), a second phase modulator ("PM2"), and an intensity modulator ("IM"). Each of these modulators, PM1, PM2, and IM, is driven by an RF signal with a fixed frequency. Before driving the modulators, the RF signal is amplified by an RF amplifier resulting in an amplitude of the RF signal being a few times of the half-wave voltage of the first phase modulator PM1. In this example, the RF clock frequency is 25 GHz and the RF peak-to-peak voltage after the RF amplification is 17V. A lightwave generated from an external cavity laser ("ECL") is modulated by the first phase modulator PM1. After modulation by the first phase modulator PM1, multiple subcarriers with varying amplitudes can be generated as shown by the optical spectrum in FIG. 1(a). In this example, the half-wave voltage and the insertion loss of the phase modulator is 4V and 3.8 dB, respectively. Due to the limited amplitude of the RF signal, the number of subcarriers is also limited. To generate more subcarriers, the lightwave is further modulated by the second phase modulator PM2. The phase relationship of the electrical signals on the first phase modulator PM1 and the second phase modulator PM2 may be carefully adjusted to generate the greatest number of subcarriers. Optical spectra of the lightwave, after being modulated by the second phase modulator PM2, are shown in FIG. 1(b) and FIG. 1(c) with the greatest and smallest number of subcarriers respectively. To generate subcarriers with flat optical peaks, after being modulated by the series of phase modulators PM1 and PM2, the lightwave is modulated by the intensity modulator ("IM"). FIG. 1(d) shows the resulting lightwave's optical spectrum with 21 subcarriers.

In certain aspects of the present invention, one or more of the elements provided may take the form of computing devices. A "computing device", as used herein, refers to a general purpose computing device that includes a processor. A processor generally includes a Central Processing Unit ("CPU"), such as a microprocessor. A CPU generally includes an arithmetic logic unit ("ALU"), which performs arithmetic and logical operations, and a control unit, which extracts instructions (e.g., code) from a computer readable medium, such as a memory, and decodes and executes them, calling on the ALU when necessary. "Memory", as used herein, generally refers to one or more devices or media capable of storing data, such as in the form of chips or drives. Memory may take the form of one or more random-access memory ("RAM"), read-only memory ("ROM"), programmable read-only memory ("PROM"), erasable programmable read-only memory ("EPROM"), or electrically erasable programmable read-only memory ("EEPROM") chips, by way of further non-limiting example only. Memory may take the form of one or more solid-state, optical or magnetic-based drives, by way of further non-limiting example only. Memory may be internal or external to an integrated unit including the processor. Memory may be internal or external to a computing device. Memory may store a computer program, e.g., code or a sequence of instructions being operable by the processor. In certain aspects of the present invention, one or more of the elements provided may take the form of code being executed using one or more computing devices, such as in the form of computer device executable programs or applications being stored in memory.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of generating a multi-subcarrier optical signal, the method comprising:
    oscillating one or more signals to generate one or more oscillating signals;
    amplifying the one or more oscillating signals to generate one or more amplified oscillating signals;
    phase modulating a lightwave through a series of at least two phase modulators, comprising a first phase modulator and a second phase modulator, the phase modulators being driven by the one or more amplified oscillating signals comprising a first amplified oscillating signal and a second amplified oscillating signal, to generate a phase modulated lightwave, wherein the phase modulated lightwave comprises between 15 and 30 subcarriers, exclusively, and wherein the first phase modulator is driven by the first amplified oscillating signal and the second phase modulator is driven by the second amplified oscillating signal;
    intensity modulating the phase modulated lightwave using an intensity modulator, the intensity modulator being driven by one of the one or more amplified oscillating signals, to generate the multi-subcarrier optical signal; and
    phase shifting the one or more amplified oscillating signals to generate one or more amplified oscillating phase shifted signals, wherein the second phase modulator is driven by one of the one or more amplified oscillating phase shifted signals to generate the subcarriers.

2. The method of claim 1, wherein each phase modulator is driven by a different one of the amplified oscillating signals.

3. The method of claim 1, wherein the first amplified oscillating signal and the second amplified oscillating signal are out of phase by 90°.

4. The method of claim 1, the one or more amplified oscillating signals comprising a third amplified oscillating signal, wherein the intensity modulator is driven by the third amplified oscillating signal.

5. The method of claim 4, wherein the first amplified oscillating signal and the third amplified oscillating signal are out of phase by 90°.

6. The method of claim 1, wherein the intensity modulator is driven by one of the one or more amplified oscillating phase shifted signals.

7. The method of claim 1, wherein the phase modulated lightwave comprises 21 subcarriers.

8. A system for generating a multi-subcarrier optical signal, the system comprising:
    a local oscillator configured to generate one or more oscillating signals;
    one or more of an RF amplifier configured to amplify the one or more oscillating signals to generate one or more amplified oscillating signals;
    a series of at least two phase modulators comprising a first phase modulator and a second phase modulator, configured to modulate a lightwave to generate a phase modulated lightwave, wherein the first phase modulator is driven by the first amplified oscillating signal and the second phase modulator is driven by the second amplified oscillating signal, wherein the phase modulated lightwave comprises between 15 and 30 subcarriers, exclusively, the series of phase modulators being driven by one of the one or more amplified oscillating signals;
    an intensity modulator configured to modulate the phase modulated lightwave to generate the multi-subcarrier optical signal, the intensity modulator being driven by one of the amplified oscillating signals; and
    a means for phase shifting the one or more amplified oscillating signals to generate one or more amplified oscillating phase shifted signals, wherein the second phase modulator is driven by one of the one or more amplified oscillating phase shifted signals to generate the subcarriers.

9. The system of claim 8, wherein each phase modulator is driven by a different one of the amplified oscillating signals.

10. The system of claim 8, wherein the first amplified oscillating signal and the second amplified oscillating signal are out of phase by 90°.

11. The system of claim 8, the one or more amplified oscillating signals comprising a third amplified oscillating signal, wherein the intensity modulator is driven by the third amplified oscillating signal.

12. The system of claim 11, wherein the first amplified oscillating signal and the third amplified oscillating signal are out of phase by 90°.

13. The system of claim 8, wherein the intensity modulator is driven by one of the one or more amplified oscillating phase shifted signals.

14. A computer program product for generating a multi-subcarrier optical signal, the computer program-product residing on a computer-readable medium and comprising computer-readable instructions configured to cause a computer to:
    oscillate one or more signals to generate one or more oscillating signals;
    amplify the one or more oscillating signals to generate one or more amplified oscillating signals;
    phase modulate a lightwave through a series of at least two phase modulators comprising a first phase modulator and a second phase modulator, the phase modulators being driven by the one or more amplified oscillating signals comprising a first amplified oscillating signal and a second amplified oscillating signal, to generate a phase modulated lightwave, wherein the phase modulated lightwave comprises between 15 and 30 subcarriers, exclusively, and wherein the first phase modulator is driven by the first amplified oscillating signal and the second phase modulator is driven by the second amplified oscillating signal;
    intensity modulate the phase modulated lightwave using an intensity modulator, the intensity modulator being driven by one of the one or more amplified oscillating signals, to generate the multi-subcarrier optical signal; and
    phase shift the one or more amplified oscillating signals to generate one or more amplified oscillating phase shifted signals, wherein the second phase modulator is driven by one of the one or more amplified oscillating phase shifted signals to generate the subcarriers.

15. The product of claim 14, wherein each phase modulator is driven by a different one of the amplified oscillating signals.

16. The product of claim 14, wherein the first amplified oscillating signal and the second amplified oscillating signal are out of phase by 90°.

17. The product of claim 14, the one or more amplified oscillating signals comprising a third amplified oscillating signal, wherein the intensity modulator is driven by the third amplified oscillating signal.

18. The product of claim 17, wherein the first amplified oscillating signal and the third amplified oscillating signal are out of phase by 90°.

19. The product of claim 14, wherein the intensity modulator is driven by one of the one or more amplified oscillating phase shifted signals.

\* \* \* \* \*